US009809003B2

(12) United States Patent
Gower

(10) Patent No.: US 9,809,003 B2
(45) Date of Patent: Nov. 7, 2017

(54) CUSTOMIZABLE PROTECTIVE BARRIER, DEVICES, SYSTEMS, AND METHODS OF PROTECTING STRUCTURES

(71) Applicant: Teddy Gower, West Palm Beach, FL (US)

(72) Inventor: Teddy Gower, West Palm Beach, FL (US)

(73) Assignee: TARGUS INTERNATIONAL COMPANY, West Palm Beach, FL (US)

( * ) Notice: Subject to any disclaimer, the term of this patent is extended or adjusted under 35 U.S.C. 154(b) by 0 days.

(21) Appl. No.: 14/821,105

(22) Filed: Aug. 7, 2015

(65) Prior Publication Data
US 2016/0039173 A1 Feb. 11, 2016

Related U.S. Application Data

(60) Provisional application No. 62/034,978, filed on Aug. 8, 2014.

(51) Int. Cl.
*B32B 5/02* (2006.01)
*B32B 7/12* (2006.01)
(Continued)

(52) U.S. Cl.
CPC ............... *B32B 5/024* (2013.01); *B32B 3/04* (2013.01); *B32B 5/022* (2013.01); *B32B 5/04* (2013.01); *B32B 5/08* (2013.01); *B32B 5/22* (2013.01); *B32B 5/26* (2013.01); *B32B 7/045* (2013.01); *B32B 7/12* (2013.01); *B32B 25/10* (2013.01);
(Continued)

(58) Field of Classification Search
None
See application file for complete search history.

(56) References Cited

U.S. PATENT DOCUMENTS 3,168,749 A * 2/1965 Cala .................. A41D 1/06
428/121
6,176,050 B1 * 1/2001 Gower .................. E04H 9/14
135/115
(Continued)

OTHER PUBLICATIONS

[NPL-1] Miami-Dade County Department of Regulatory and Economic Resources (RER) Board and Code Administration Division NOA No. 10/0417.14. Expiration Date Jan. 26, 2017. Approval Date Feb. 7, 2013. (Relevant Page(s): p. 4).*
(Continued)

*Primary Examiner* — David Sample
*Assistant Examiner* — Donald M Flores, Jr.
(74) *Attorney, Agent, or Firm* — Cantor Colburn LLP

(57) ABSTRACT

Devices, systems, and methods for providing do-it-yourself protection from environmental forces to at least a portion of a structure are provided. The device can include a woven fabric having at least one edge with opposing first and second sides and a reinforcing fabric having a first portion and a second portion, at least the first portion being attached to a portion of the woven fabric at the at least one edge to form at least one reinforced portion, the device being afixable to the structure by at least one anchor extending through the reinforced portion into the structure, the at least one reinforced portion providing tear-resistance at the location of the anchor extending therethrough.

19 Claims, 8 Drawing Sheets

(51) Int. Cl.

| | |
|---|---|
| *B32B 3/04* | (2006.01) |
| *B32B 5/26* | (2006.01) |
| *E06B 3/30* | (2006.01) |
| *E06B 1/60* | (2006.01) |
| *E06B 9/52* | (2006.01) |
| *B32B 5/04* | (2006.01) |
| *B32B 5/08* | (2006.01) |
| *B32B 5/22* | (2006.01) |
| *B32B 7/04* | (2006.01) |
| *B32B 25/10* | (2006.01) |
| *B32B 25/14* | (2006.01) |
| *E06B 3/00* | (2006.01) |
| *B60J 9/00* | (2006.01) |
| *B60J 9/04* | (2006.01) |

(52) U.S. Cl.
CPC ............ *B32B 25/14* (2013.01); *E06B 1/60* (2013.01); *E06B 3/30* (2013.01); *E06B 9/52* (2013.01); *B32B 2260/021* (2013.01); *B32B 2260/046* (2013.01); *B32B 2262/0253* (2013.01); *B32B 2262/0269* (2013.01); *B32B 2262/0276* (2013.01); *B32B 2262/14* (2013.01); *B32B 2307/40* (2013.01); *B32B 2307/554* (2013.01); *B32B 2307/5825* (2013.01); *B32B 2307/712* (2013.01); *B32B 2307/714* (2013.01); *B32B 2419/00* (2013.01); *B60J 9/00* (2013.01); *B60J 9/04* (2013.01); *E06B 3/00* (2013.01)

(56) References Cited

U.S. PATENT DOCUMENTS

| | | | |
|---|---|---|---|
| 6,325,085 | B1 | 12/2001 | Gower |
| 6,865,852 | B2 | 3/2005 | Gower |
| 6,886,299 | B2 | 5/2005 | Gower |
| 8,082,970 | B2 | 12/2011 | Gower |
| 8,393,055 | B2 | 3/2013 | Gower |
| 8,505,263 | B2 | 8/2013 | Gower |
| D723,836 | S | 3/2015 | Gower |
| D723,837 | S | 3/2015 | Gower |
| 2011/0048220 | A1* | 3/2011 | Dickson ............ B32B 5/12 89/36.02 |

OTHER PUBLICATIONS

[NPL-2] ASTM International; "D 4751-04". (Dec. 14, 2008).*
Miami-Dade County Department of Regulatory and Economic Resources (RER) Board and Code Administration Division NOA No. 12-0417.14 Expiration Date Jan. 26, 2017 Approval Date Feb. 7, 2013 14 Pages.

* cited by examiner

Fig_1

Fig_2

Fig_3

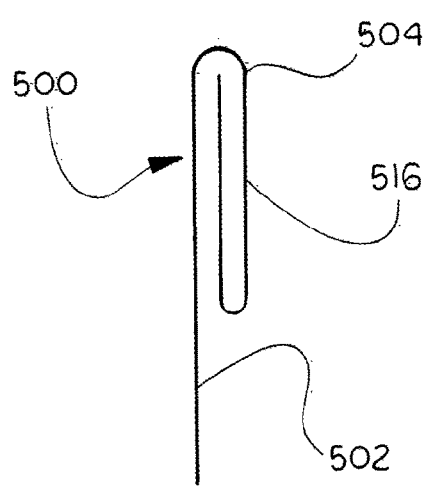
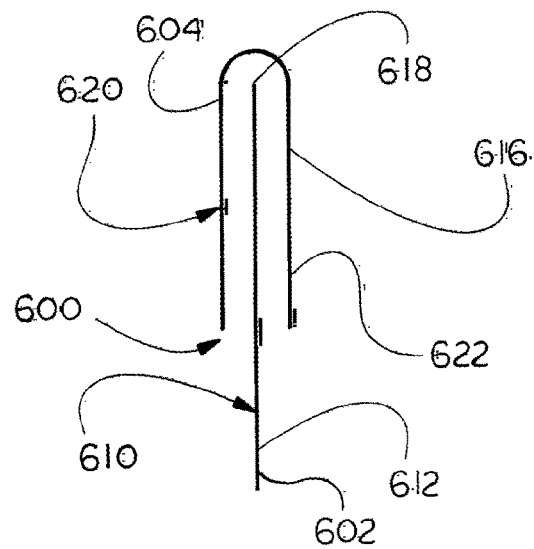
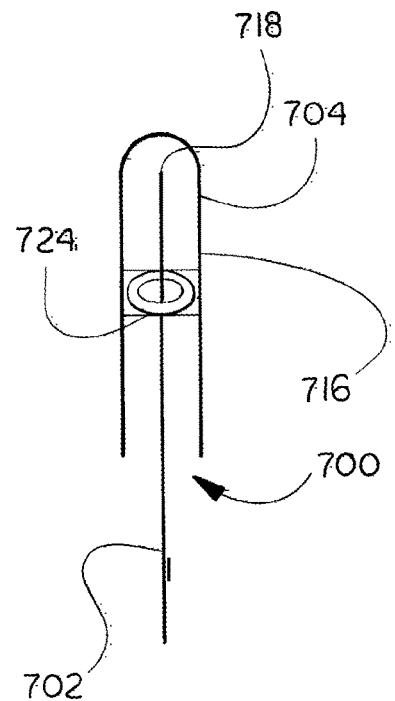
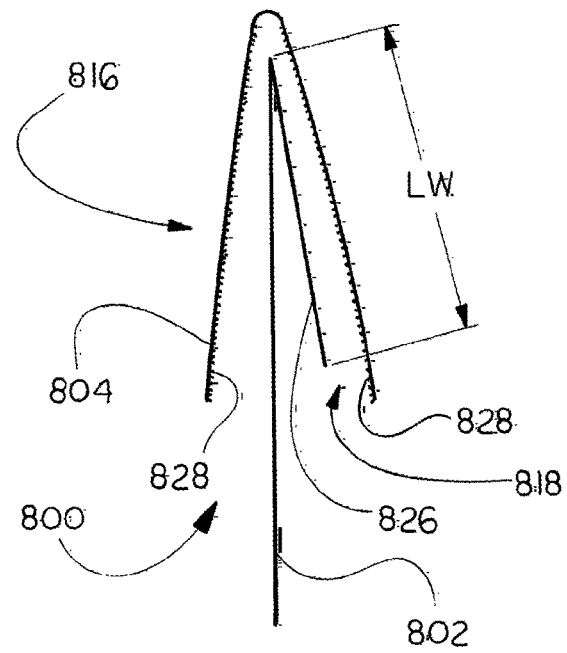

CUSTOMIZABLE PROTECTIVE BARRIER, DEVICES, SYSTEMS, AND METHODS OF PROTECTING STRUCTURES

CROSS-REFERENCE TO RELATED APPLICATION

This application claims priority to provisional U.S. Application No. 62/034,978 filed on Aug. 8, 2014, which is hereby incorporated by reference in its entirety.

BACKGROUND

The present teachings relate generally to the field of protective barrier devices, systems, and methods, and more particularly to a protective barrier device for protecting structures from wind-launched debris.

Various protective barrier devices exist tier protecting buildings and the like from damage caused by environmental forces. Environmental forces can include any applied force, such as the heavy winds and/or rains of hurricanes or tornadoes and the missile-like objects that these forces may create, or any other force, such as pressure-washing, sand-blasting overspray, and other applied forces. These protective barrier devices include commercially available variations of weather-related protective devices that fasten immediately over a frangible area such as a window to be protected. These devices are typically expensive to purchase, cumbersome, made from stiff, heavy material such as wood, steel and/or aircraft quality aluminum alloy or occasionally plastic with reinforcing. Many need to be manually connected and then removed and stored at each threat of inclement weather. Many require unsightly and difficult-to-mount reinforcing bars at multiple locations. Further, these known materials are usually opaque, preventing light frorn entering a protected area and preventing an inhabitant from seeing out. Likewise, it is desirable that police be able to see into buildings to check for inhabitants and to guard against looting which can be a problem in such circumstances. Missiles, even small not potentially damaging missiles, striking these known materials can create a loud, often frightening bang that is disturbing to inhabitants being protected.

Additionally, protective devices can be formed of flexible, mesh materials. These flexible barriers are less cumbersome, inexpensive, and quieter than other protective barrier devices. These flexible, mesh protective devices can be neatly stored and quickly installed. However, such flexible protective barrier devices are susceptible to tearing at the point of anchor insertion. This is, at least in part, because the anchor can damage and deteriorate the fabric at the anchor insertion point. These flexible protective barriers are also susceptible to damage or are otherwise expensive to shape and form immediately prior to installation at the structure site due, in part, to the flexible material becoming susceptible to fraying at the edge portion.

Additionally, there have been attempts to sell do-it-yourself ("DIY") kits utilizing flexible mesh materials, among other things, but none have been commercially acceptable. These kits have suffered due in part to the requirement of the flexible mesh barrier body having to be commercially finished such that the customer had to send in sizes and shapes and then the barriers would be custom formed using systems that include heavy commercial sewing machines and heat welders, to create each individual barrier as a one-off customized item. Likewise, the anchoring systems available to the various earlier DIY systems have been slow, cumbersome and have proven to be weak and insufficient to withstand even a minor hurricane. To be able to DIY the barrier on site, and thereby save the time and such for commercial finishing, fabric was used that did not have all of the herein described desirable properties for weather protection. Moreover, previous applications suffered from adhesives that did not have sufficient adhesion, shear strength retention, flexibility, resistance to UV, water, chemicals and biological degradants, all at high temperatures of around 200 degrees F.

Standardized testing requires these protective devices to meet certain standards of strength and integrity tier various utilizations and locales. In order to qualify for use where testing requirements apply, the strength and integrity characteristics of these protective devices must be predictable and must be sufficient to meet mandated standards. Additionally, it is beneficial to qualify for these standards even in situations in which standards do not apply. These standards exacerbate many undesirable aspects of protective barrier devices.

Thus, improved protective barrier devices, systems, and methods of protecting structures from environmental forces, including improved protective barrier devices constructed from a fabric that will resist tearing and can be custom fitted by a consumer that can be easily stored and deployed for protecting a frangible portion of a structure from environmental forces is desired.

SUMMARY OF THE INVENTION

In some aspects, a device for providing protection from environmental forces to at least a portion of a structure is provided. The device can include a woven fabric having at least one edge with opposing first and second sides and a reinforcing fabric having a first portion and a second portion, at least the first portion being attached to a portion of the woven fabric at the at least one edge to form at least one reinforced portion, the device being afixable to the structure by at least one anchor extending through the reinforced portion into the structure, the at least one reinforced portion providing tear-resistance at the location of the anchor extending therethrough.

In some aspects, a device for providing protection from environmental forces to at least a portion of a structure is provided that includes a protective woven fabric having at least one edge and a first fold at the at least one edge, a reinforcing fabric having a second fold positioned over the first fold of the protective woven fabric to encapsulate the folded at least one edge of the protective woven fabric, and an adhesive disposed between the reinforcing fabric and the protective woven fabric to attach the reinforcing fabric to the protective woven fabric.

In some aspects, a kit for providing at least a portion of a structure protection from environmental forces is provided. The kit can include at least one anchor and a protective woven fabric having at least one edge, the woven fabric being formed of filaments woven such that the filaments retain stability relative to one another. The woven fabric can have an Apparent Opening Size in the range of about 10 US STD Sieve to about 70 US STD Sieve as measured in accordance with American Society for Testing and Materials International (ASTM International) Standards D4751. Furthermore, the kit can include a reinforcing fabric having an adhesive backing such that the reinforcing fabric is configured to be attached to the protective woven fabric by pressing the adhesive backing to the edge portion of the protective woven fabric allowing the adhesive to penetrate through at least a portion of the protective woven fabric and reinforcing fabric so as to reinforce the edge of the protective woven fabric to allow the at least one anchor to pass through the edge without tearing the protective woven fabric at the location where the anchor extends therethrough.

BRIEF DESCRIPTION OF THE DRAWINGS

This disclosure will be more fully understood from the following detailed description taken in conjunction with the accompanying drawings, in which:

FIG. 5 is a schematic view of a reinforced portion of a protective barrier;

FIG. 6 is a schematic view of a reinforced portion of a protective barrier;

FIG. 7 is a schematic view of a reinforced portion of a protective barrier;

FIG. 8 is a schematic view of a reinforced portion of a protective barrier;

DETAILED DESCRIPTION

Figure 1:
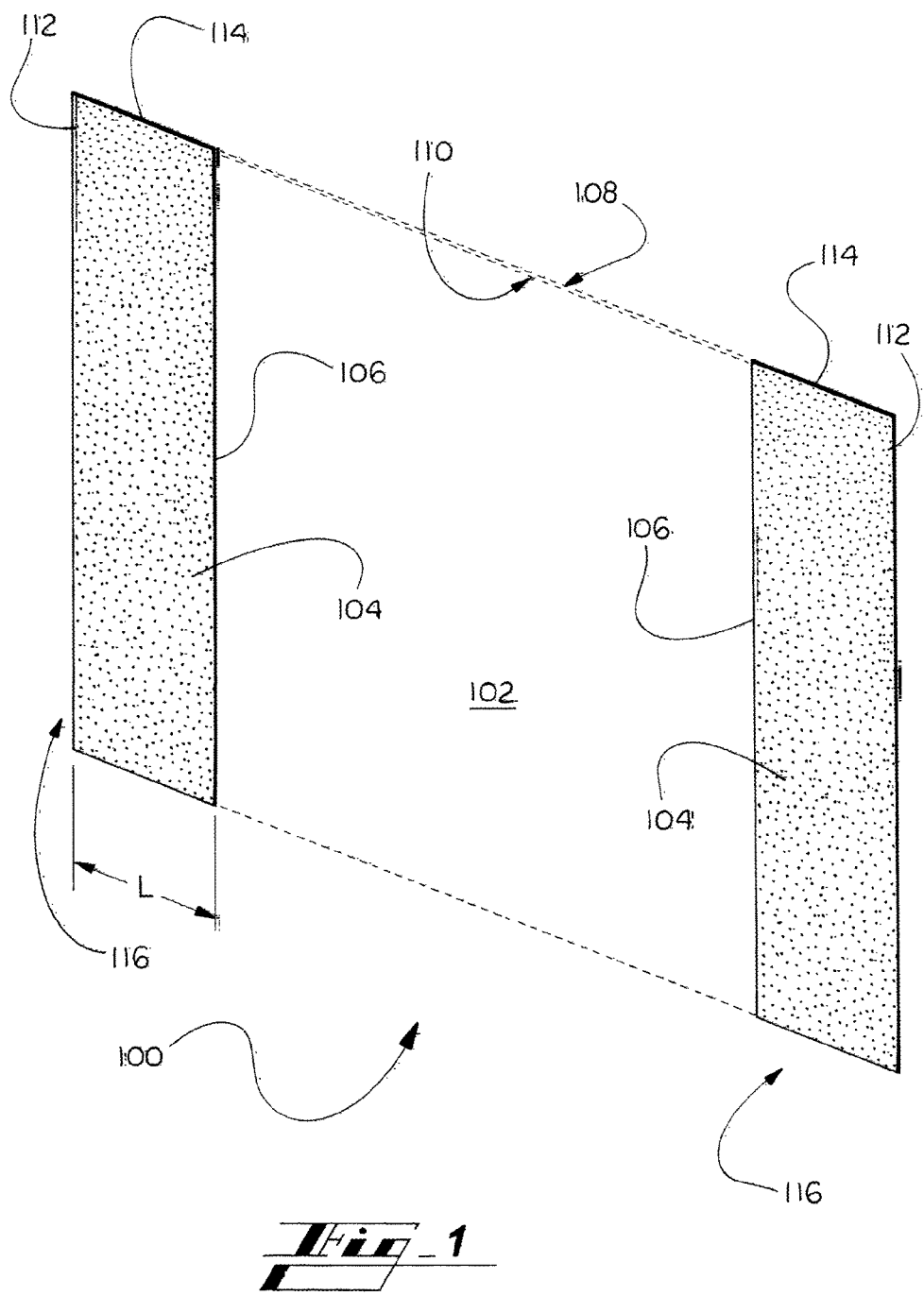
FIG. 1 is a partially transparent schematic view of a protective barrier device.

Certain exemplary aspects will now be described to provide an overall understanding of the principles of the structure, function, manufacture, and use of the devices, systems, methods, and kits disclosed herein. One or more examples of these aspects are illustrated in the accompanying drawings. Those skilled in the art will understand that the devices, systems, methods, and kits disclosed herein and illustrated in the accompanying drawings are non-limiting and exemplary in nature and that the scope of the present invention is defined solely by the claims. The features illustrated or described in connection with any one aspect described may be combined with the features of other aspects. Such modification and variations are intended to be included within the scope of the present disclosure.

Further in the present disclosure, like-numbered components generally have similar features, and thus each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can be determined for any geometric shape. Sizes and shapes of the systems and devices, and the components thereof, can depend at least on the size and shape of the components with which the systems and devices will be used, and the methods and procedures in which the systems and devices will be used.

To provide structural support and protect a structure from environmental forces—including high-velocity winds and rain—protective barrier devices as described herein can be affixed to the structure. For example, a protective barrier device can be affixed to a house such that the protective barrier spans across a door, window, or any other portion of the structure which is to be protected, to prevent wind-blown objects, i.e., missile-like objects, wind, rain, or other environment force, from damaging the portion of the structure to be protected.

Additionally, as described above, do-it-yourself ("DIY") installation of protective barrier devices has long been needed and not previously possible. The protective barrier devices described herein, however, lend themselves to said DIY installation. Specifically, the combination functional qualities of the protective barrier devices described herein—such as Ultraviolet ("UV") resistance, outward visibility, and ease of sizing and anchoring, among other things—allow them to be easily installed by an end user in a DIY manner.

FIGS. 1-4 illustrate a protective barrier device 100 that includes a protective woven fabric 102 and a reinforcing fabric 104. The protective woven fabric has at least one edge 106 with opposing first 108 and second sides 110. The reinforcing fabric 104 can be formed of any suitable fabric, such as a woven or non-woven fabric, and has a first portion 112 and a second portion 114, at least the first portion 112 being attached to a portion of the protective woven fabric 102 at the at least one edge 106 to form at least one reinforced portion 116. The device can be afixable to a structure (not shown) by at least one anchor (not shown) extending through the reinforced portion 116 into the structure. The at least one reinforced portion 116 can provide tear-resistance at the location of the anchor extending through the reinforced portion 116. The protective barrier device can be so dimensioned to fit a desired structure to be protected, for example about 144 inches from one edge portion 116 to an opposing edge portion 116. For example, the protective barrier device can be configured to protect a window, door, or other portion of a structure.

Figure 2:
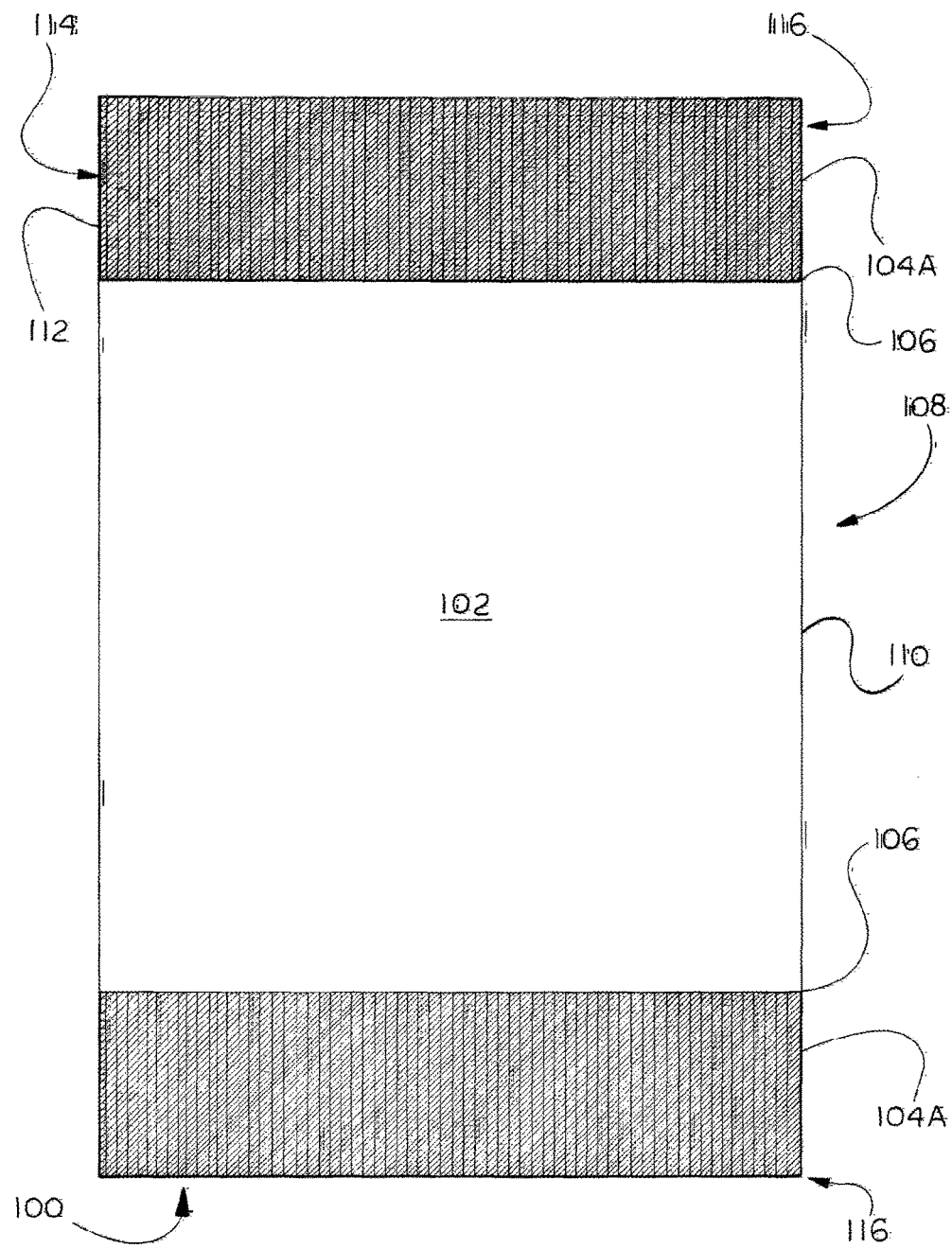
FIG. 2 is a schematic view of the protective barrier device of FIG. 1 having a woven reinforcing fabric.
Figure 3:
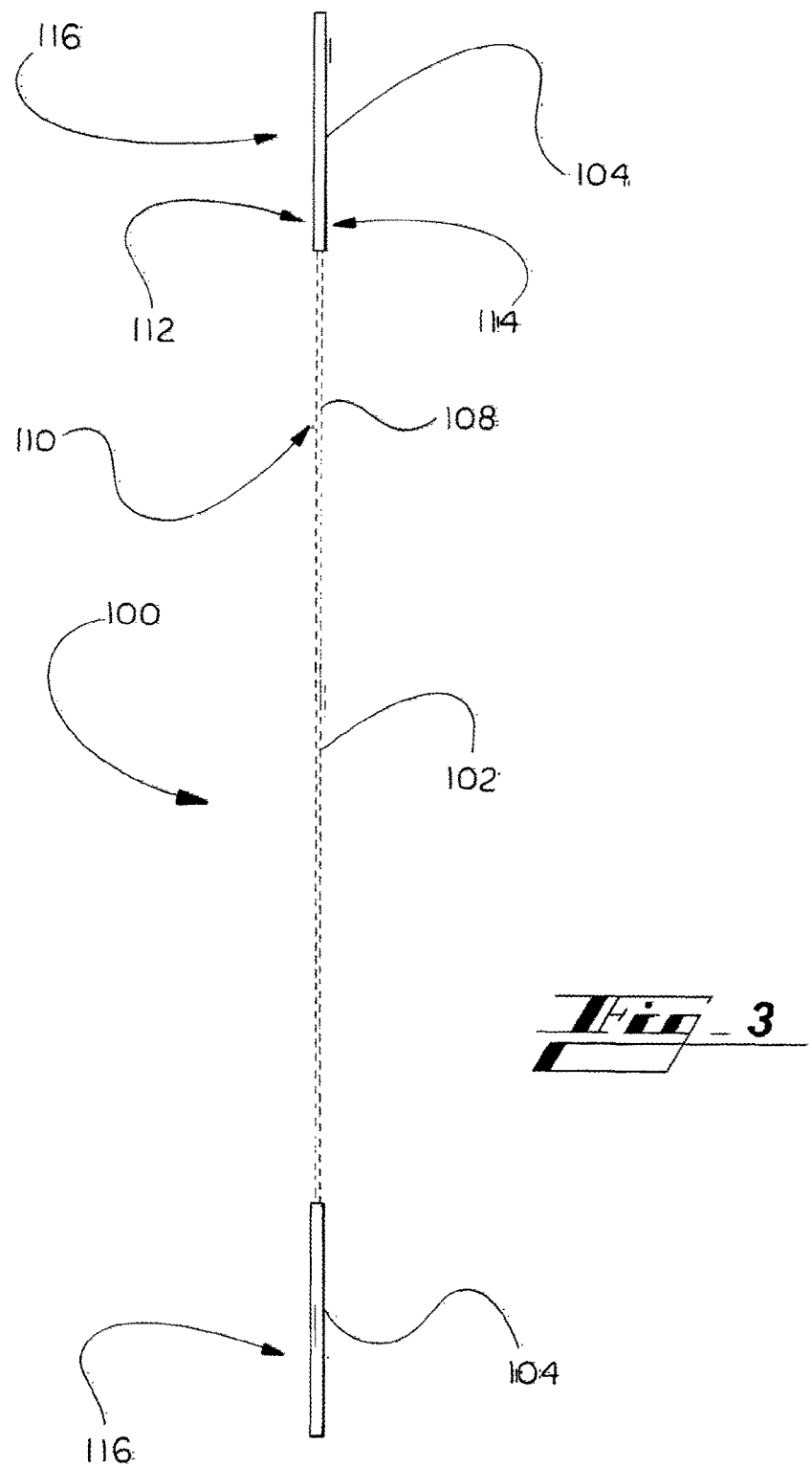
FIG. 3 is an end view of the protective barrier device of FIG. 1.

FIG. 2 further illustrates an aspect of an illustrative protective barrier device. As shown, the protective woven fabric 102 can be formed from any known or hereafter discovered woven fabric, including but not limited to, geotextile materials. In one aspect, the protective woven fabric 102 has a weave pattern that is configured to have outward visibility—namely, visibility through the fabric 102 from inside the structure to outside the structure—through the woven fabric 102. That is, the woven fabric 102 can have a weave pattern that allows a person located inside the structure to see through the woven fabric 102 to observe surroundings outside of the structure. Additionally, the protective woven fabric 102 can have a weave pattern which reduces wind velocity, water flow rate, or both through the woven fabric 102.

"Woven" can mean a web or fabric having a structure of individual fibers or yarns which are interlaid in a predetermined manner. A woven fabric can have two principle directions, one being the warp direction and the other being the weft direction. The weft direction is also referred to as the fill direction. The warp direction is the length wise, or machine direction of the fabric. The fill or weft direction is the direction across the fabric, from edge to edge, or the direction traversing the width of the weaving machine. Thus, the warp and fill directions are generally perpendicular to each other. The set of yarns, threads, or monofilaments running in each direction are referred to as the warp yarns and the fill yarns, respectively.

A woven fabric can be produced with varying densities. This is usually specified in terms of number of the ends per inch in each direction, warp and fill. The higher this value is, the more ends there are per inch and, thus, the fabric density is greater or higher. The weave pattern of fabric construction is the pattern in which the warp yarns are interlaced with the fill yarns. A woven fabric is characterized by an interlacing of these yarns. For example, plain weave is characterized by a repeating pattern where each warp yarn is woven over one fill yarn and then woven under the next fill yarn. There are many variations of weave patterns commonly employed in the textile industry, and those of ordinary skill in the art are familiar with most of the basic patterns. While it is beyond the scope of the present application to include a disclosure of these multitude of weave patterns, the basic plain, twill, and satin weave patterns can be employed with the present invention. However, such patterns are only illustrative, and the disclosure is not limited to such patterns. Those of ordinary skill in the art will readily be able to determine how a given weave pattern could be employed in practicing the present invention in light of the parameters herein disclosed. For example, the weave pattern can include a plain weave, a twill weave, a satin weave, or any other suitable weave, such as a 3×6, 3×3, and/or 3×4 basket weave.

A twill weave, relative to the plain weave, has fewer interlacings in a given area. The twill is a basic type of weave, and there are a multitude of different twill weaves. A twill weave is named by the number of fill yarns which a single warp yarn goes over and then under. For example, in a 2/2 twill weave, a single warp end weaves over two fill yarns and then under two fill yarns. In a 3/1 twill weave, a single warp end weaves over three fill yarns and then under one fill yarn. For fabrics being constructed from the same type and size of yarn, with the same thread or monofilament densities, a twill weave has fewer interlacings per area than a corresponding plain weave fabric. A basket weave is a variation of plain weave in which two or more threads are bundled and then woven as one in the warp and/or weft directions.

A satin weave, relative to the twill and plain weaves, has fewer interlacings in a given area. It is another basic type of weave from which a wide array of variations can be produced. A satin weave is named by the number of ends on which the weave pattern repeats. For example, a five harness satin weave repeats on five ends and a single warp yarn floats over four fill yarns and goes under one fill yarn. An eight harness satin weave repeats on eight ends and a single warp yarn floats over seven fill yarns and passes under one fill yarn. For fabrics being constructed from the same type of yarns with the same yarn densities, a satin weave has fewer interlacings than either a corresponding plain or twill weave fabric.

The process for making fabrics, such as geotextile fabrics, is well known in the art. Thus, the weaving process employed can be performed on any conventional textile handling equipment suitable for producing the fabric. Further, any of the aforementioned patterns and weaves may be employed as long as the protective layer made therefrom is sufficient to provide the aforementioned cut and tear resistance while maintaining permeability.

In one aspect, the protective woven fabric 102 can include or otherwise be formed from a synthetic textile material, or any other textile material. The woven fabric 102 can include fibers, yarns, or any other known threads. These fibers, yarns, or any other known threads can be formed from any material. For example, the woven fabric 102 can be formed from monofilament yarns formed from polypropylene, polyester, polyethylene, aramid, or any combination thereof. In an aspect, the fibers, yarns, or threads can be formed so as to proved abrasion, ultraviolet light, chemical, biological, or other resistance. The monofilament yarns can include additives to provide any desired property or resistance. For example, the monofilament yarns can include an additive such as a colorant, a filler, a delustrant, a thermal stabilizer, an ultraviolet light absorber, an ultraviolet light stabilizer, a terminating agent, an antioxidant, a metal deactivator, a phosphite, a phosphonite, a fluorescent whitening agent, a thiosynergist, a peroxide scavenger, a nucleating agent, a plasticiser, a lubricant, an emulsifier, a rheology additive, a catalyst, a flow-control agent, an optical brightener, a flameproofing agent, an antistatic agent, a blowing agent, a benzofuranone, an indolinone, a hydrophilic agent, a hydrophobic agent, an oliophobic agent, an oliophilic agent, or any combination thereof. The additives can be formed in or coated on the yarns. Additionally, the fibers, yarns, or threads forming the woven fabric 102 can have any dimension suitable to provide the properties described herein. For example, the woven fabric can include yarns having a size between about 500 denier and 5000 denier. In some aspects, the woven fabric can be Hurricane Barrier Fabric HBE, HBEBK, HBEW, HBEW, and/or HBK currently available from TenCate® Geosynthetics Americas, or TenCate® Geosynthetics Americas product numbers 29205, 29201, 24109, and/or 24119.

As mentioned, the protective woven fabric 102 can include or otherwise be formed from a synthetic textile material. Textile materials, as known in the art, have various properties that can be measured by standardized tests, such as those currently published by the American Society for Testing and Materials ("ASTM") International Standards and local building codes, such as the Florida Building Code Testing Application Standards ("TAS"). In addition to standardizing testing procedures, various local building codes establish standards for protective barrier devices, such as the current Florida Building Code's High Velocity Hurricane Zones standards, which include the currently published TAS 201-94 Impact Test, TAS 202-94 Criteria for Testing Impact & Nonimpact Resistant Building Envelope Components Using Uniform Static Air Pressure, and TAS 203-94 Criteria for Testing Products Subject to Cyclic Wind Pressure Loading.

For example, the protective woven fabric 102, can have a bursting strength, as measured in accordance with ASTM International Standards D3786, of at least about 25 pounds per square inch, at least about 50 pounds per square inch, and/or at least about 61.3 pounds per square inch. In some aspects, the woven fabric 102 can have a bursting strength between about 50 pounds per square inch and 1500 pounds per square inch. In an aspect, the bursting strength of the woven fabric 102 can be about 675 pounds per square inch. In another aspect, the bursting strength of the woven fabric 102 can be about 750 pounds per square inch. Any fabric or material, however, with suitable bursting strength can be used in accordance with the teachings herein.

The protective woven fabric 102 can also have a grab tensile strength, as measured in accordance with ASTM International Standards D4632, between about 250 MD×250 CD pounds of force and about 750 MD×750 CD pounds of force. In an aspect, the woven fabric 102 can have a grab tensile strength of about 425 MD×325 CD pounds of force. In an aspect, the protective woven fabric 102 can have a grab tensile strength of about 500 MD×550 CD pounds of force.

Any fabric or material, however, with suitable grab tensile strength can be used in accordance with the teachings herein.

Additionally, the protective woven fabric 102 can be formed to have a specific Apparent Opening Size. "Apparent Opening Size" (AOS) is a test method used to indicate the AOS in a textile that reflects the approximate largest opening dimension available for particles to pass through. The AOS can be determined according to the currently published test standard set by the America Society for Testing and Materials ("ASTM") D4751. AOS can be determined by dry sieving uniform sized glass beads of a known standard sieve size through the textile until the weight of beads passing through the textile is 5% or less. The AOS value is expressed as a US STD Sieve # and/or in millimeters. In some aspects, the protective woven fabric 102 can have an AOS in the range of about 10 US STD Sieve to about 70 US STD Sieve. The AOS of the woven fabric 102 can be about 30 US STD Sieve. Any fabric or material with suitable AOS, however, can be used in accordance with the teachings herein.

In addition to AOS, the protective woven fabric 102 can be formed to have a specific Percent Open Area. "Percent Open Area" (POA) "average openness," is the area of distinct, uniform, and measurable openings of a textile that is not occupied by filaments or yarns and is given as a percent of total fabric area that is open. The POA can be determined based on Army Corps of Engineers Civil Works Construction Guide Specification COE-02215 dated November 1977. In some aspects, the POA can be less than about 25%, between about 2.5% and about 20%, between about 5% and about 15%, and/or less than about 10%. In an aspect, the POA of the woven fabric 102 is about 5%. Any fabric or material with suitable POA, however, can be used in accordance with the teachings herein.

As shown in FIGS. 1-5, a reinforcing fabric 104 can be attached to the protective woven fabric 102 at an edge portion 106. The reinforcing fabric can be formed of any suitable fabric, such as woven fabric, non-woven fabric, extruded fabric, or any other suitable fabric. In some aspects, as shown in FIG. 1, the reinforcing fabric 104 can be formed of a non-woven fabric. In some aspects, as shown in FIG. 2, the reinforcing fabric 104 can be formed of a woven fabric.

"Non-woven" means a web or fabric having a structure of individual fibers or threads which are randomly interlaid, but not in an identifiable manner as is the case of a knitted or woven fabric. The non-woven fabric can be formed from threads, fibers, or yarns using any methods currently used or hereafter discovered for making fibers and yarns into fabrics, including various process for producing non-woven fabrics using chemical, mechanical, heat, or solvent treatment. By way of non-limiting example, suitable non-woven fabrics include geosynthetic fabrics such as those currently available from TenCate® Geosynthetics Americas, including TenCate® Polyfelt® TS, TenCate® Polyfelt® P, TenCate® Polyfelt® F, and TenCate® Polyfelt® AR. Additionally, in some aspects, the reinforcing fabric can be Hurricane Barrier Fabric HBE, HBEBK, HBEW, HBEW, and/or HBK currently available from TenCate® Geosynthetics Americas, and/or TenCate® Geosynthetics Americas product numbers 29205, 29201, 24109, and/or 24119.

The reinforcing fabric, whether woven, non-woven, extruded fabrics, or combinations thereof, can include any known fabric forming material, such as fibers, yarns, or threads formed of polypropylene, polyester, polyethylene, aramid, or any combination thereof. The fibers, yarns, or threads can be formed so as to provide abrasion, ultraviolet light, chemical, biological, or other resistance. The reinforcing fabric can include additives to provide the desired property or resistance. For example, the fibers, yarns, or threads forming a non-woven fabric can include an additive or additives such as a colorant, a filler, a delustrant, a thermal stabilizer, an ultraviolet light absorber, an ultraviolet light stabilizer, a terminating agent, an antioxidant, a metal deactivator, a phosphite, a phosphonite, a fluorescent whitening agent, a thiosynergist, a peroxide scavenger, a nucleating agent, a plasticiser, a lubricant, an emulsifier, a rheology additive, a catalyst, a flow-control agent, an optical brightener, a flameproofing agent, an antistatic agent, a blowing agent, a benzofuranone, an indolinone, a hydrophilic agent, a hydrophobic agent, an oliophobic agent, an oliophilic agent, or any combination thereof. The additives can be formed in or coated on the fabric.

Figure 4:
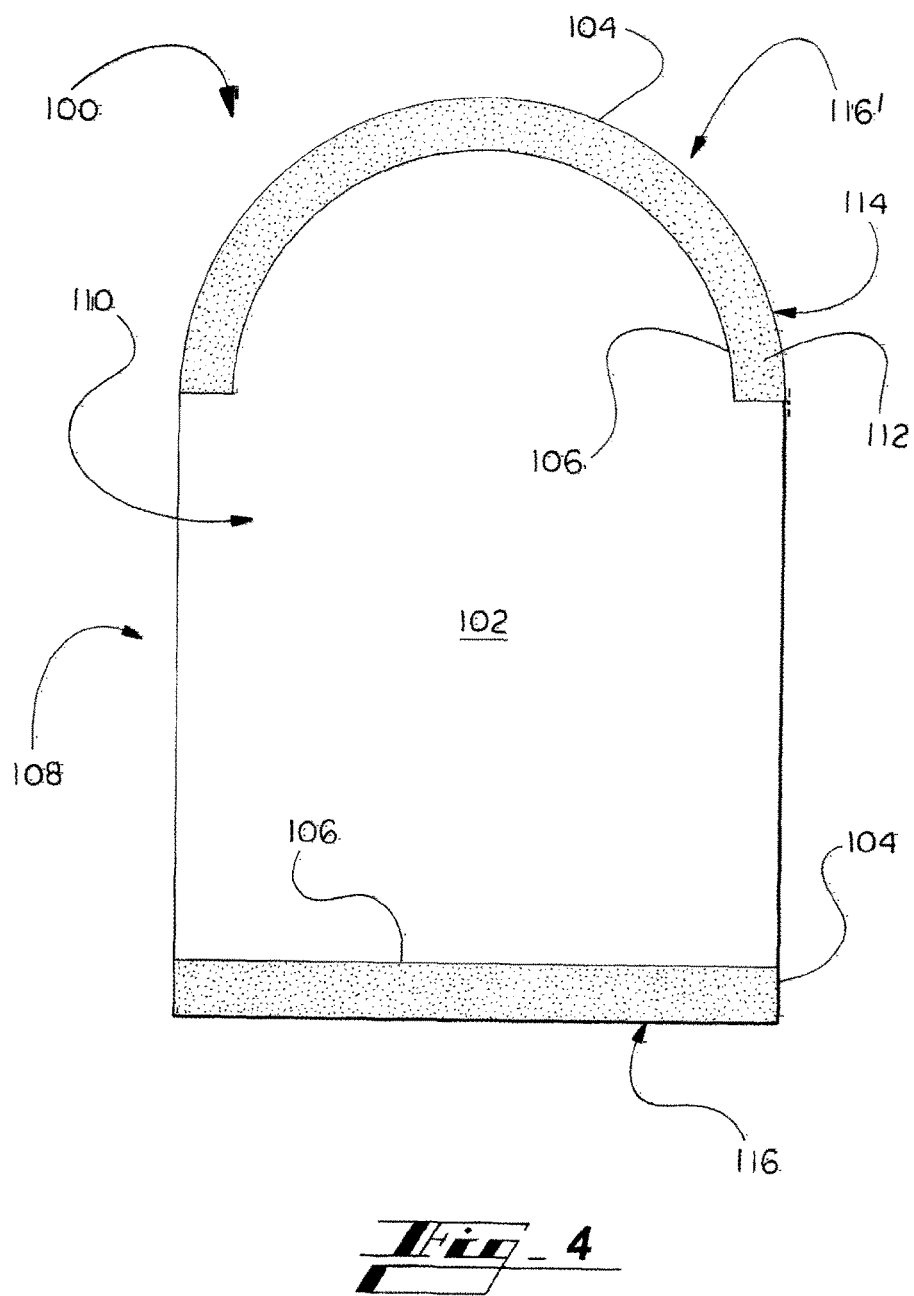
FIG. 4 is a schematic view of the protective barrier device of FIG. 1 having an arcuate shape.

Furthermore, the reinforcing fabric can be any dimension necessary to provide the appropriate reinforcement portion for the protective barrier device. For example, the reinforcing fabric can be dimensioned such that the reinforced portion 116, as shown in FIG. 1, has length L of about 1 inch to about 12 inches. In some aspects, the length L can be about 5 inches in length. Any suitable length, however, can be used in accordance with the teachings herein. Furthermore, protective barrier devices can be formed in any shape to protect a desired structure. For example, rectangular, arcuate, circular, ovular, or triangular protective barrier devices can be utilized. FIG. 4 depicts a protective barrier device 100 having a reinforced edge portion 116' having an arcuate shape and an opposing reinforced edge portion 116 having a rectangular shape.

As shown in FIGS. 5-8, the protective barrier 500, 600, 700, 800 includes a reinforced edge portion 516, 616, 716, 816 which can include a reinforcing fabric 504, 604, 704, 804 attached to the woven fabric 502, 602, 702, 802 in any manner so as to provide a reinforced edge portion 516, 616, 716, 816. As described herein, the reinforcing fabric can be a non-woven fabric or a woven fabric.

FIG. 5 illustrates an aspect wherein the reinforced edge portion 516 is formed by folding the protective woven fabric 502 so as to create a multi-layer portion. The reinforced edge portion 516 can have a reinforcing fabric 504 attached thereto and folded over along with the protective woven fabric 502.

FIG. 6 illustrates an aspect wherein the reinforced edge portion 616 is formed by encapsulating the protective woven fabric 602 with a reinforcing fabric 604 by folding the reinforcing fabric 604 around the edge 618 of the protective woven fabric 602 and attaching the reinforcing fabric 604 with an adhesive. The reinforcing fabric 604 can have a first portion 620 that is attached to a first side 610 of the protective woven fabric 602 using an adhesive. A second portion 622 of the reinforcing fabric 604 can then be folded around the edge 618 of the protective woven fabric 602 such that the second portion 622 contacts a second, opposing side 612 of the protective woven fabric 602. The adhesive can be configured to substantially penetrate through the protective woven fabric 602 so as to adhere to both the first portion 620 and the second portion 622 of the reinforcing fabric 604. The adhesive can be applied directly to the first portion 620 of the reinforcing fabric, the second portion 622 of the reinforcing fabric, the first side 610 of the woven fabric, the second side 612 of the woven fabric, or any combination thereof.

FIG. 7 illustrates an aspect wherein the protective woven fabric 702 is encapsulated with the reinforcing fabric 704 as described above with respect to the reinforcing fabric 604 of FIG. 6, but includes a grommet 724. The grommet 724 can be configured to allow the passage of an anchor through the protective barrier without using the anchor to penetrate through the edge portion 716.

FIG. 8 illustrates an aspect wherein the protective woven fabric 802 is first folded near the edge 818 to form a folded edge portion 826 of the woven fabric. The folded edge portion 826 can have a length $L_w$ of any desired length. In some aspects, the length $L_w$ of the folded edge portion 826 can be less than about 5 inches, less than about 3 inches, less than about 2 inches, or less than about 1 inch. As is shown, the reinforcing fabric 804 can be folded over the folded edge portion of the protective woven fabric 802 to form the reinforced portion. That is, the reinforcing fabric 804 can encapsulate this folded portion of the protective woven fabric 802 so as to form a reinforced portion 816. As such, the protective barrier 800 can include an adhesive 828. As shown, folding the edge portion of the woven fabric to form the folded edge 826, once encapsulated within the reinforcing fabric 804, can allow a reinforcing anchor to be placed closer to the edge of the device and thus can reduce the amount of fabric required to create the reinforced edge portion.

Any suitable adhesive can be used in accordance with the teachings herein. As used herein, "adhesive" and "adhesive glue" are synonymous and can include any suitable substance to bind materials. In some aspects, the adhesive can strongly adhere to low surface tension fabrics and materials, such as the woven fabrics described herein. Additionally, in some aspects the adhesive can maintain flexibility when adhered and can maintain its shear strength to a high temperature without softening. Furthermore, the adhesive can have a shear/adhesion strength that is about the same as the tear strength of the fabric, as is described herein. For example, the adhesive can comprise a synthetic elastomer. By way of further example, the adhesive can comprise at least one of a polyvinyl ester, polyvinyl acetate, polyamide, polyester, epoxy, polyethylene, polystyrene, natural rubber, and polyacrylate. Additionally or alternatively, in some aspects, the adhesive can comprise ethylene propylene rubber, nitrile butadiene rubber, iso butylene isoprene rubber, and/or any other elastomers known in the art that provide sufficient strength, versatility, aesthetics, light weight, flexibility, and/or lends itself to finishing on site by DIY people and contractors alike. In an aspect, the adhesive can comprise a hot melt having a thermal activation temperature of at least about 180° F. In some aspects, the hot melt can have a thermal activation temperature of at least about 200° F. Additionally, in some aspects, the barrier can be used outdoors, and as such can be exposed to ultraviolet ("UV") radiation and other agents that can degrade some adhesives. As such, in some aspects the adhesive can have resistance to UV and other attackers such as biological and chemical, commonly found in the outdoors. For example, through trial and error it was surprisingly found that in some aspects a synthetic elastomer hot melt is an exemplary adhesive having strength, retained flexibility when set, UV resistance, and retained shear strength in the high heat often found in outdoor locations.

In some aspects, a peel-and-stick type adhesive can be used. That is, the adhesive can be disposed on the reinforcing fabric such that the reinforcing fabric has an adhesive backing. Alternatively, the adhesive can be disposed on the protective woven fabric in a similar manner. In this aspect, the adhesive backing can be covered by a removable adhesive backing covering that is designed to be peeled-off and discarded immediately prior to installation, such as a plastic or paper sheet. In some aspects, the adhesive may be applied to the reinforcing fabric such that there are two portions of the reinforced fabric coated with the adhesive that are separated by a dividing portion. In so doing, the peel-and-stick type adhesive reinforcing fabric is easily adhered to the protective woven fabric in the variety of manners described herein, such as those shown in FIGS. 5-8.

Figure 9:
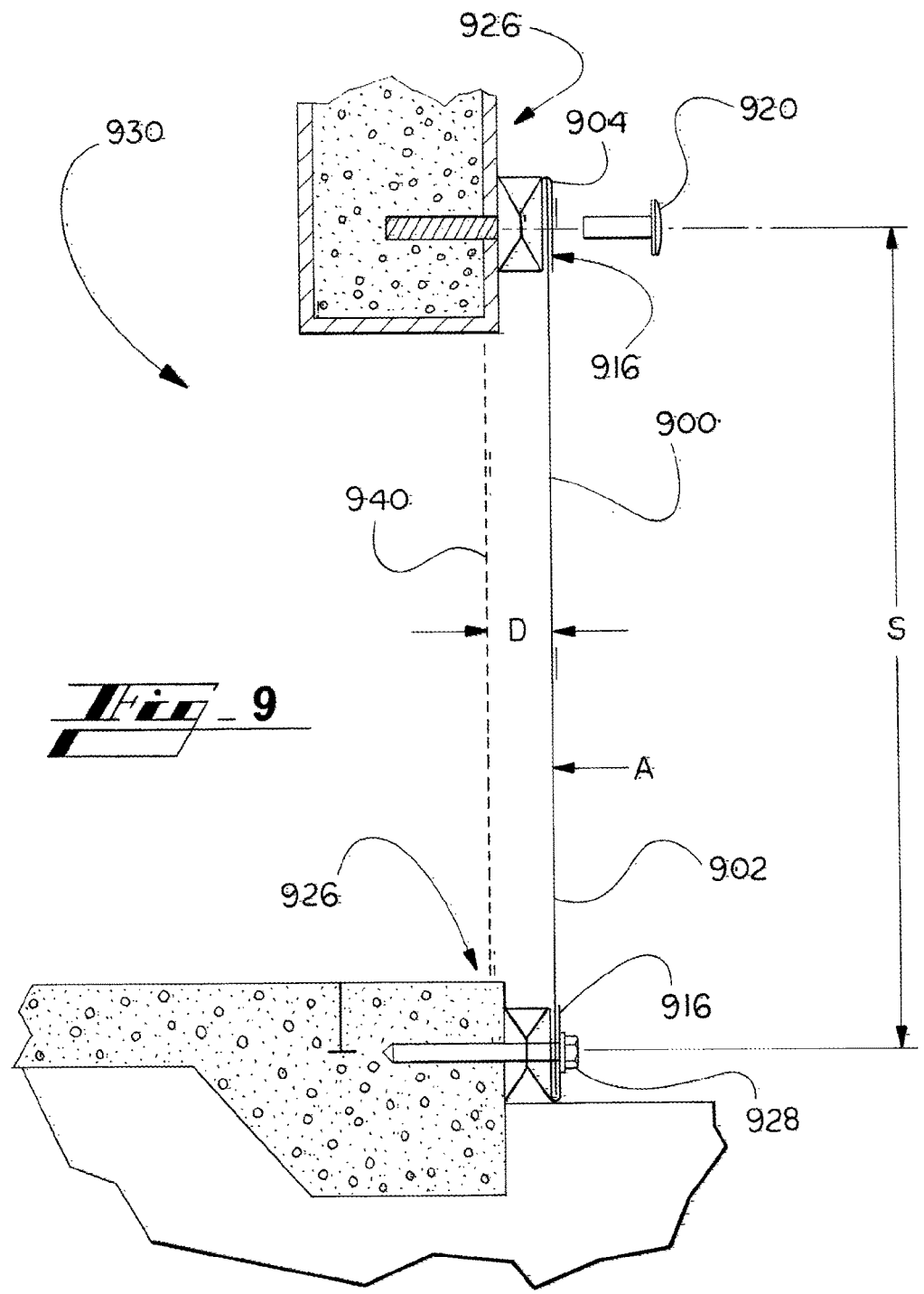
FIG. 9 is a schematic view of a protective barrier affixed to a structure.

In use, the protective barrier device can be affixed to a structure with an anchor. As shown in FIG. 9, the protective barrier device 900 is attached to a structure 926 using anchors 928. The anchor 928 can be configured to penetrate through the reinforced portion 916 of the protective barrier device 900, as the reinforced portion 916 provides tear-resistance at the point of anchor 928 penetration through the reinforced portion 916. In an aspect, the protective barrier device 900 can be attached to the structure 926 to protect an interior area 938 of the structure to protect the interior area 938 from wind generated force and wind-blown objects. For example, an installer can determine an amount of space, i.e. an area, to be protected and determine an amount of deflection necessary to decelerate a wind-blown object. Deflection D between the protective barrier device 900 and a frangible portion of the structure, such as window 940, is the minimum glass separation as measured at the mid-span of the protective barrier device 900 and is characterized by how far the protective barrier will flex toward the window 940 when a force is applied in a direction along line A, such as when hit by a missile-like object.

To form the protective barrier device 900, a protective woven fabric 902, such as a woven fabric having a burst strength of at least 61.3 pounds per square inch as measured in accordance with the current American Society for Testing and Materials International (ASTM International) Standards D3786, is provided to fit the amount of space to be protected 938 such that an edge portion 916 of the protective woven fabric 902 extends beyond the space to be protected 938. This can include shaping the protective woven fabric 902, such as by cutting with scissors, tin-snips, or any other cutting device. As described above, a reinforcing fabric 904 can be attached to the edge portion of the woven fabric using an adhesive such that the adhesive penetrates through the woven fabric and/or binds to at least portions of the fibers comprising the woven fabric. The reinforcing fabric 904 can also be shaped to fit the desired edge portion 916 of the protective woven fabric 902 such that the edge portion 916 is reinforced to be tear-resistant and is configured to overlap the structure 926 to allow the protective barrier device 900 to be anchored to the structure 926. In some aspects, the protective barrier device 900 can be shaped so as to extend past the area to be protected, which in some non-limiting examples can be a distance of at about one and one-half times the deflection distance D. The deflection distance D can be any suitable distance, for example D can be about 0 inches to about 500 inches.

As mentioned, the protective barrier device 900 can be secured or attached to the structure 926 by extending, such as by penetrating or otherwise passing through an opening, at least one anchor 928 through the edge portion 916 of the protective woven fabric to a portion of the structure 926 such that the protective woven fabric spans the space to be protected 938. Typically, a plurality of anchors is required to attach the protective barrier 900 to the structure 926. The distance between each anchor on opposed sides of the structure 926 is referred to as the anchor span S, and can be any suitable distance. By way of non-limiting example, the anchor span S can be between about 0 inches and about 500 inches, between about 25 inches and 400 inches, between about 50 inches and 300 inches, and/or between about 100 inches and 200 inches. In one aspect, the span S can be about 144 inches or less.

Figure 10:
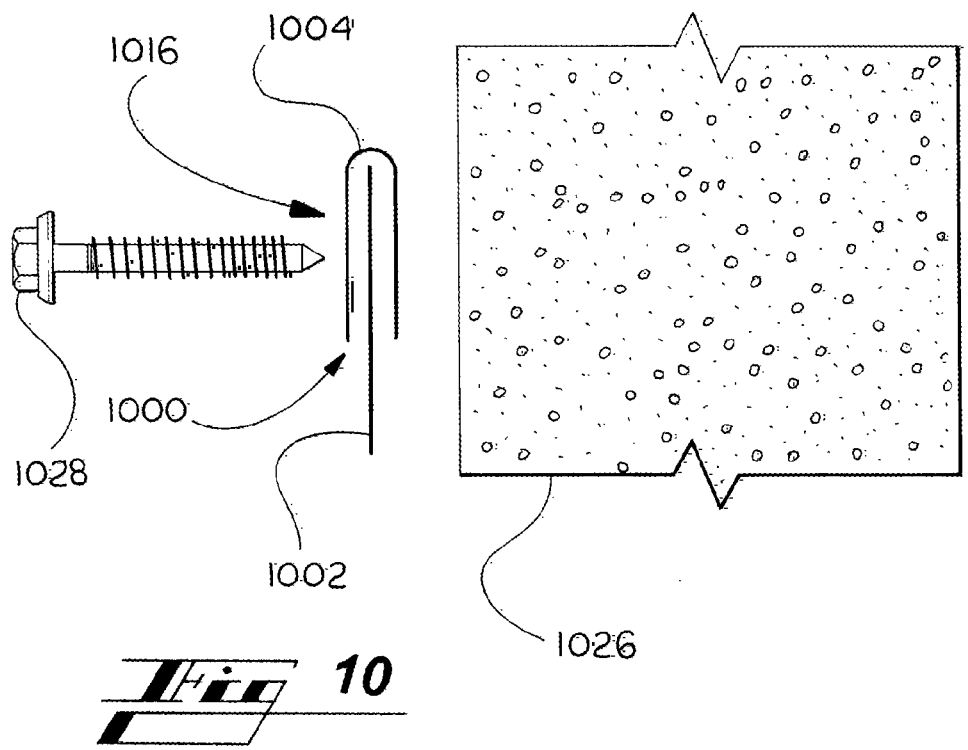
FIG. 10 is a schematic view of an anchor used to affix a protective barrier to a structure.

A variety of anchors and anchor systems can be used in accordance with the teachings herein. Anchors can include, but are not limited to, screws, Tapcon screws, Spax screws, Panelmate screws and inserts, solid set anchors, calk-in anchors, drop-in anchors, lag screws, self-drilling screws, hangar bolts, sidewalk bolts, male studs, washered head bolts, hex nuts, flange nuts, cap nuts, wing nuts, and C-channels. As shown in FIG. 10, a screw-type anchor 1028 can be used to penetrate through the reinforced portion 1016 of the protective barrier device 1000 to attach the protective barrier device 1000 to the structure 1026, as described above. In this aspect, the screw-type anchor penetrates through the non-woven fabric 1004 and the woven fabric 1002, but this reinforced portion 1016 is tear resistant at the point where the screw-type anchor 1028 penetrates therethrough.

Figure 11:
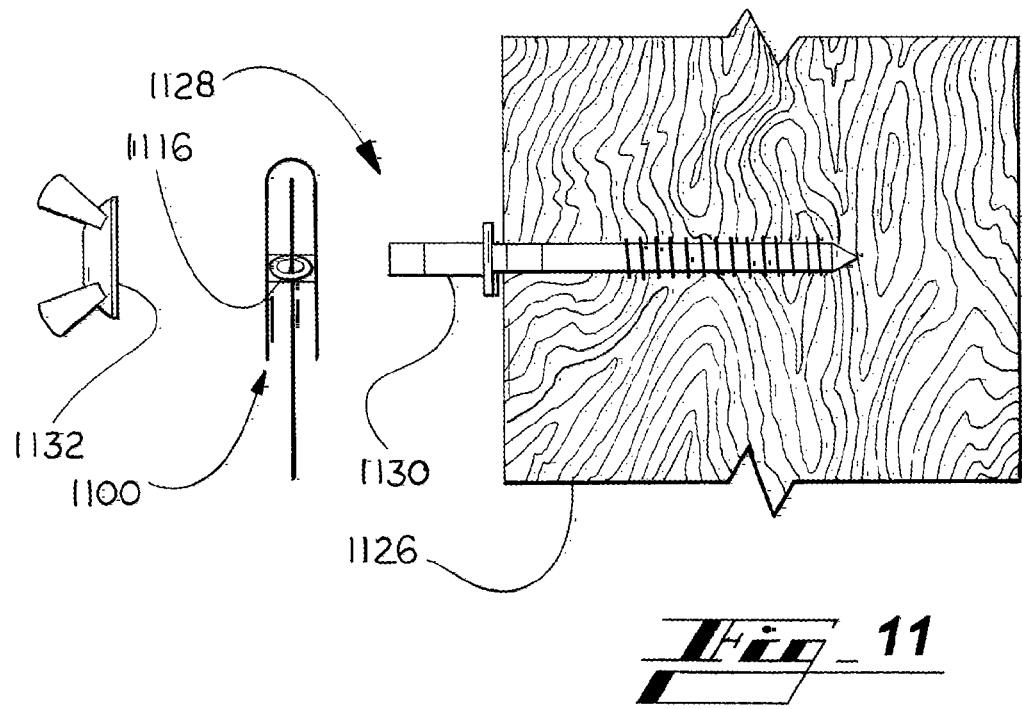
FIG. 11 is a schematic view of an anchor used to affix a protective barrier to a structure.
Figure 12:
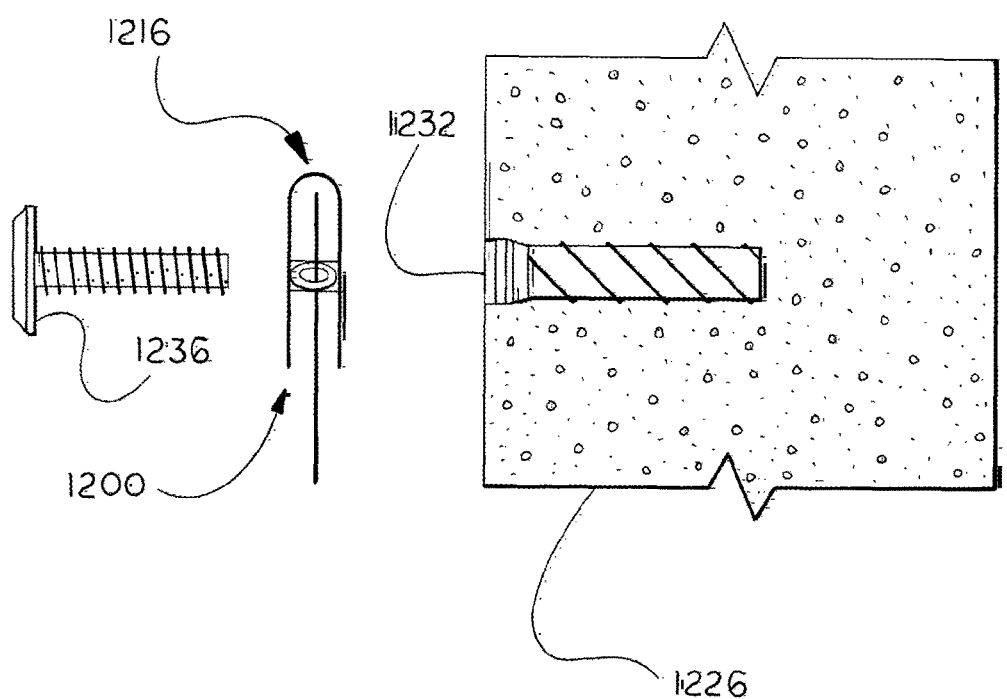
FIG. 12 is a schematic view of an anchor used to affix a protective barrier to a structure.

Alternatively, FIG. 11 illustrates a male anchor system 1128, such as a hangar bolt 1130 with washered wingnut 1132 or nut and washer, for attaching the protective barrier 1100 to the structure 1126. In this aspect, the male anchor—hangar bolt 1130—extends through the reinforced portion 1116 and either the wingnut 1132 or nut and washer are affixed to the male anchor to secure the protective barrier device 1100 to the structure. FIG. 12 illustrates a female anchor system whereby a female anchor 1236 is set in the structure 1226 and a corresponding male anchor 1236 is then passed through the reinforced portion 1216 of the protective barrier device 1200.

Furthermore, it should be understood that the devices, systems, and methods described herein can be used in combination with any anchoring system, deflection system, or storage system. This includes but is not limited to pneumatic deflection systems, storm bars, or roll-up storage system. It should also be understood that the fabrics disclosed herein can be any color, such as black, cream, brown, or white.

What is claimed is:

1. A device for providing do-it-yourself protection from environmental forces to at least a portion of a structure, comprising:
    a protective woven fabric having at least one edge with opposing first and second sides; and
    a reinforcing fabric having a first portion and a second portion, at least the first portion being attached to a portion of the woven fabric at the at least one edge to form at least one reinforced portion, wherein an adhesive attaches the reinforcing fabric to the protective woven fabric, the device being affixable to the structure by at least one anchor extending through the reinforced portion into the structure, the at least one reinforced portion providing tear-resistance at the location of the anchor extending therethrough.

2. The device of claim 1, wherein the reinforcing fabric is a non-woven fabric.

3. The device of claim 2, wherein the non-woven reinforcing fabric comprises at least one of a polypropylene, polyester, aramid, or polyethylene fabric.

4. The device of claim 1, wherein the reinforcing fabric is a reinforcing woven fabric.

5. The device of claim 1, wherein the woven fabric comprises a weave pattern having outward visibility therethrough.

6. The device of claim 1, wherein the woven fabric comprises a weave pattern which reduces wind velocity therethrough, water flow rate therethrough, or both.

7. The device of claim 1, wherein the woven fabric comprises monofilament yarn formed from polypropylene, polyester, polyethylene, aramid, or any combination thereof.

8. The device of claim 7, wherein the monofilament yarn further includes an additive, the additive being a colorant, a filler, a delustrant, a thermal stabilizer, an ultraviolet light absorber, an ultraviolet light stabilizer, a terminating agent, an antioxidant, a metal deactivator, a phosphite, a phosphonite, a fluorescent whitening agent, a thiosynergist, a peroxide scavenger, a nucleating agent, a plasticiser, a lubricant, an emulsifier, a rheology additive, a catalyst, a flow-control agent, an optical brightener, a flameproofing agent, an antistatic agent, a blowing agent, a benzofuranone, an indolinone, a hydrophilic agent, a hydrophobic agent, an oliophobic agent, an oliophilic agent, or any combination thereof.

9. The device of claim 1, wherein the protective woven fabric has an Apparent Opening Size in the range of about 10 US STD Sieve to about 70 US STD Sieve as measured in accordance with American Society for Testing and Materials International (ASTM International) Standards D4751.

10. The device of claim 1, wherein the adhesive is a synthetic elastomer hot melt.

11. The device of claim 1, wherein the reinforcing fabric comprises an adhesive backing whereby the reinforced fabric is attached to the protective woven fabric.

12. The device of claim 1, wherein an adhesive penetrates at least a portion of the protective woven fabric and a portion of the reinforcing fabric whereby the protective and reinforcing fabrics are attached to one another.

13. The device of claim 1, wherein the protective woven fabric comprises a first fold at the at least one edge and the reinforcing fabric comprises a second fold positioned over the first fold to encapsulate the folded at least one edge of the woven fabric to form the reinforced portion.

14. A device for providing do-it-yourself protection from environmental forces to at least a portion of a structure, comprising:
    a protective woven fabric having at least one edge and a first fold at the at least one edge;
    a reinforcing fabric having a second fold positioned over the first fold of the protective woven fabric to encapsulate the folded at least one edge of the protective woven fabric; and
    an adhesive disposed between the reinforcing fabric and the protective woven fabric to attach the reinforcing fabric to the protective woven fabric.

15. The device of claim 14, wherein the reinforcing fabric is a non-woven fabric.

16. The device of claim 14, wherein the adhesive comprises a synthetic elastomer hot melt.

17. A kit for providing do-it-yourself protection from environmental forces to at least a portion of a structure, comprising:
    at least one anchor;
    a protective woven fabric having at least one edge, the woven fabric being formed of filaments woven such that the filaments retain stability relative to one another, the woven fabric having an Apparent Opening Size in the range of about 10 US STD Sieve to about 70 US STD Sieve as measured in accordance with American Society for Testing and Materials International (ASTM International) Standards D4751; and
    a reinforcing fabric having an adhesive backing such that the reinforcing fabric is configured to be attached to the protective woven fabric by pressing the adhesive backing to the edge portion of the protective woven fabric allowing the adhesive to penetrate through at least a portion of the protective woven fabric and reinforcing fabric so as to reinforce the edge of the protective woven fabric to allow the at least one anchor to pass through the edge without tearing the protective woven fabric at the location where the anchor extends therethrough.

18. The kit of claim 17, wherein the wherein the adhesive is a synthetic elastomer hot melt.

19. The kit of claim 17, wherein the protective woven fabric comprises a first fold at the at least one edge and the reinforcing fabric comprises a second fold positioned over the first fold to encapsulate the folded at least one edge of the woven fabric to form the reinforced portion.

* * * * *